United States Patent [19]

Aihara et al.

[11] 4,312,797

[45] Jan. 26, 1982

[54] AQUEOUS COATING COMPOSITION

[75] Inventors: Tetsuo Aihara; Yasuharu Nakayama; Kuninosuke Nakanishi; Yoshio Yamashita; Isao Toyomoto, all of Hiratsuka, Japan

[73] Assignee: Kansai Patent Co., Ltd., Hyogo, Japan

[21] Appl. No.: 160,739

[22] Filed: Jun. 18, 1980

[30] Foreign Application Priority Data

Jun. 28, 1979 [JP] Japan .................................. 54/80791

[51] Int. Cl.³ .......................... C08L 91/00; C09D 3/80; C09D 5/02
[52] U.S. Cl. ............................ 260/23 AR; 260/23 CP; 260/23 ST; 260/23 S; 428/461; 428/500; 428/522; 428/523
[58] Field of Search ......... 260/23 CP, 23 ST, 23 AR, 260/23 S; 428/461, 500, 522, 523

[56] References Cited

U.S. PATENT DOCUMENTS

| | | | |
|---|---|---|---|
| 2,653,141 | 9/1953 | Greenlee | 260/18 EP |
| 3,112,284 | 11/1963 | Greenlee et al. | 260/22 R |
| 3,284,385 | 11/1966 | D'Alelio | 260/23 AR |
| 3,287,293 | 11/1966 | Dalibor | 260/22 CB |
| 3,288,736 | 11/1966 | Wright et al. | 260/23 AR |
| 3,676,384 | 7/1972 | Rheineck et al. | 260/23 AR |
| 3,988,273 | 10/1976 | Aihara et al. | 260/23 AR |
| 4,107,114 | 8/1978 | Nakayama et al. | 260/23 AR |
| 4,122,052 | 10/1978 | Aihara et al. | 260/23 AR |
| 4,186,116 | 1/1980 | Dhein et al. | 260/23 AR |

FOREIGN PATENT DOCUMENTS 50-97604  8/1975  Japan .............................. 260/23 CP Primary Examiner—Ronald W. Griffin
Attorney, Agent, or Firm—Wenderoth, Lind & Ponack

[57]  ABSTRACT

An aqueous coating composition comprising a resin in a water-soluble or water-dispersible form as a film-forming component, said resin being a copolymer of (A) a fatty acid-modified acrylic monomer comprising the reaction product of an unsaturated fatty acid having at least two non-conjugated double bonds with a hydroxyl-containing acrylic or methacrylic ester, (B) an $\alpha,\beta$-ethylenically unsaturated carboxylic acid, and (C) an unsaturated monomer having a Q value, determined by the Q-e theory, of at least 0.1.

24 Claims, No Drawings

AQUEOUS COATING COMPOSITION

This invention relates to a novel aqueous coating composition, and more specifically, to a water-soluble or water-dispersible coating composition which is curable at ordinary temperature.

Known aqueous coating compositions include an amino-curable aqueous coating composition consisting mainly of an acrylic copolymer derived from acrylic or methacrylic acid and an ester thereof, and an amino-curable aqueous coating composition of high-temperature bakable type consisting mainly of a resin obtained by introducing a tertiary aliphatic alkyl group into the glycidyl side chain of an acrylic copolymer containing a glycidyl group. These coating compositions are curable under heat, and it is generally very difficult to cure them at ordinary temperature.

On the other hand, some aqueous coating compositions curable at ordinary temperature have been known in the past, and alkyd resins are used as a typical water-soluble resin in such ordinary temperature-curable aqueous coating compositions. Since, however, the water-soluble alkyd resin contains many ester linkages in the main chain, it readily undergoes hydrolysis when maintained in the form of an aqueous solution, especially a neutralizable aqueous solution. Accordingly, aqueous coating compositions comprising the alkyd resin generally have the serious defect that they possess poor storage stability, and coated films prepared therefrom have poor water resistance, alkali resistance, weatherability, etc. and lack the basic properties required of coated films.

In order to remove the aforesaid defect of alkyd resins, the present inventors have endeavored to develop water-soluble or water-dispersible resins which do not contain hydrolyzable ester linkages in the main chain and can be cured at ordinary temperature. These efforts led to the discovery that a water-soluble or water-dispersible resin obtained by copolymerizing an $\alpha,\beta$-ethylenically unsaturated acid and an unsaturated monomer having a Q value in the Q-e theory of at least 0.1 with a fatty acid-modified monomer obtained by reacting an unsaturated fatty acid having a non-conjugated double bond with a glycidyl ester of an $\alpha,\beta$-ethylenically unsaturated acid, and neutralizing the resulting resin with a base such as ammonia, amines or alkali metals to render it water-soluble or water-dispersible is very suitable as a resinous component of an aqueous coating composition curable at ordinary temperature (see U.S. Pat. No. 3,988,273).

Since this water-soluble or water-dispersible resin does not contain ester linkages in the main chain, it is not likely to be hydrolyzed. An aqueous coating composition comprising this water-soluble or water-disperisble resin has superior storage stability, and coated films prepared from the coating composition have superior water resistance, alkali resistance, weatherability, solvent resistance and chemical resistance. Another advantage is that by varying the type of the unsaturated monomer to be copolymerized, coating compositions having various characteristics can be obtained.

From another view point, however, the glycidyl ester of an $\alpha,\beta$-ethylenically unsaturated acid, such as glycidyl acrylate or glycidyl methacrylate, used as a material for preparation of the above water-soluble or water-dispersible resin is expensive, and it is desired to develop inexpensive materials that can replace it. A coated film from an aqueous coating composition comprising the water-soluble or water-dispersible resin is satisfactory when it is completely dried. Usually, however, a period of 4 to 5 days at ambient temperature is required for complete drying, and in the incompletely dried state, the coated films have poor water resistance. Accordingly, when the coated film is to be forcibly dried at a relatively low heating temperature (usually about 100° C.), for example, in an industrial assembly line which requires rapid drying, the drying time is short and drying of the coated film tends to be insufficient. When such as half-dried coating is exposed outdoors to rainfall for even a day, it becomes whitened. Thus, such a resin still leaves room for improvement.

The present inventors made extensive investigations in order to improve the water resistance of a coated film prepared from the aforesaid aqueous coating composition and being in the half-dried state, and found that the poor water resistance of such a coated film is attributed to the introduction into the copolymer of a secondary hydroxyl group which necessarily forms in the fatty acid-modified monomer by the reaction of the glycidyl ester of an $\alpha,\beta$-ethylenically unsaturated acid with the unsaturated fatty acid having a non-conjugated double bond. Further investigations were therefore made in order to prepare a water-soluble or water-dispersible resin which has the aforeaid excellent properties and is curable at ordinary temperature, without using the glycidyl ester of an $\alpha,\beta$-ethylenically unsaturated acid.

These investigations have finally led to the discovery that a fatty acid-modified acrylic monomer obtained by reacting a hydroxyl-containing ester of acrylic or methacrylic acid instead of the glycidyl ester of an $\alpha,\beta$-ethylenically unsaturated acid with an unsaturated fatty acid containing at least two non-conjugated double bonds is quite free from the defects associated with the use of the aforesaid glycidyl ester, and that a resin obtained by copolymerizing the fatty acid-modified acrylic monomer with an $\alpha,\beta$-unsaturated carboxylic acid and an unsaturated monomer having a Q value, determined by the Q-e theory, of at least 0.1 is very effective as a resinous component of an aqueous coating composition which is fast-drying and gives a coated film having superior water resistance even in the half-dried state.

Thus, according to this invention, there is provided an aqueous coating composition comprising a resin in water-soluble or water-dispersible form as a film-forming component, said resin being a copolymer of (A) a fatty acid-modified acrylic monomer comprising the reaction product of an unsaturated fatty acid having at least two non-conjugated double bonds with a hydroxyl-containing acrylic or methacrylic ester, (B) an $\alpha,\beta$-ethylenically unsaturated carboxylic acid, and (C) an unsaturated monomer having a Q value, determined by the Q-e theory, of at least 0.1.

The "Q-e theory", as used in the present specification and appended clims, is a theory of the constant of the velocity of addition reaction of a monomer with a radical, which was advocated by T. Alfrey and C. Price in 1947 in order to deal with the radical polymerization or copolymerization of vinyl compounds systematically [see, J. Polymer Sci., 2, 101 (1947)]. It expresses the reactivity ratio of monomers in radical polymerization or copolymerization as the function of the resonance stability of the radical and the polar effect of the monomers. The "Q value" represents the degree of the resonance stability, and the "e value" is a measure of a relative charge on the double bond. Generally, styrene is taken as a standard, and is supposed to have a Q value of 1.00 and an e value of −0.80. From the results of copolymerizations, the Q and e values of other monomers are determined.

The unsaturated fatty acid used to obtain the fatty acid-modified acrylic monomer (A) in this invention is an unsaturated fatty acid, particularly an unsaturated linear or branched aliphatic monocarboxylic acid, containing at least two, preferably two or three, double bonds per molecule, the double bonds being not conjugated with each other. Suitable fatty acids are those which generally have 10 to 24 carbon atoms, preferably 14 to 20 carbon atoms, and an iodine value of at least 80, preferably at least 100. Drying oil fatty acids and semidrying oil fatty acids having at least two non-conjugated double bonds prove to be especially effective.

The drying oil fatty acids and semidrying oil fatty acids cannot be strictly defined, but generally denote monobasic acids derived from animal and vegetable oils and fats. The drying oil fatty acids generally denote unsaturated fatty acids having an iodine value of at least 130, and the semidrying oil fatty acids generally denote unsaturated fatty acids having an iodine value of 100 to 130. Typical examples of unsaturated fatty acids include safflower oil fatty acid, linseed oil fatty acid, soybean oil fatty acid, sesame oil fatty acid, poppy seed oil fatty acid, perilla oil fatty acid, hemp seed oil fatty acid, grape kernel oil fatty acid, corn oil fatty acid, tall oil fatty acid, sunflower fatty acid, cotton seed oil fatty acid, walnut oil fatty oil, and rubber seed oil fatty acid. These fatty acids can be used either singly or in combination with each other.

The amount of the unsaturated fatty acid used can be varied widely depending upon the drying property or film properties required of the aqueous coating composition provided by the present invention. Generally, the advantageous amount is 5 to 65% by weight, preferably 10 to 60% by weight, based on the weight of the copolymer obtained.

In addition of the aforesaid unsaturated fatty acid containing non-conjugated double bonds, there may be used a small amount, preferably not more than 30% by weight, more preferably not more than 20% by weight, based on the total weight of the unsaturated fatty acids, of another unsaturated fatty acid containing conjugated double bonds, such as tung oil fatty acid, oiticica oil fatty acid, dehydrated castor oil fatty acid or Hidiene fatty acid (a trademark for a conjugated fatty acid made by Soken Kagaku Co., Ltd., Japan).

The hydroxyl-containing acrylic or methacrylic ester (to be sometimes referred to as a hydroxyl-containing acrylic-type ester) to be reacted with the aforesaid unsaturated fatty acid for production of the fatty acid-modified acrylic monomer (A) includes those in which the ester residue moiety has one hydroxyl group and 2 to 24, preferably 2 to 8, carbon atoms. Suitable hydroxyl-containing acrylic-type esters are those of the following formula (I) or (II)

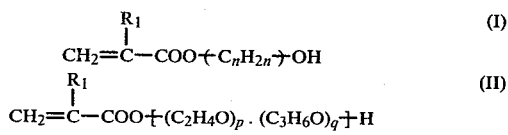

wherein $R_1$ represents a hydrogen atom or a methyl group, n is an integer of 2 to 8, and p and q each represent zero or an integer of 1 to 8 provided that the sum of p and q is 1 to 8.

Preferred hydroxyl-containing acrylic-type esters for use in this invention are hydroxyalkyl acrylates and hydroxyalkyl methacrylates of formula (I), above all 2-hydroxyethyl acrylate, 2-hydroxyethyl methacrylate, 2-hydroxypropyl acrylate and 2-hydroxypropyl methacrylate.

The fatty acid-modified acrylic monomer (A) can be prepared usually by reacting the unsaturated fatty acid with the hydroxyl-containing acrylic-type ester in the presence of an esterification catalyst, optionally in an inert solvent. The reaction is carried out at a temperature of generally about 100° to about 180° C., preferably about 120° to about 160° C., for a period of generally about 0.5 to about 9 hours, usually for about 1 to about 6 hours.

The amount of the hydroxyl-containing acrylic-type ester is usually 0.5 to 1.9 moles, preferably 1.0 to 1.5 moles, per mole of the unsaturated fatty acid.

Examples of the esterification catalyst used in the aforesaid reaction are sulfuric acid, aluminum sulfate, potassium hydrogen sulfate, p-toluenesulfonic acid, hydrochloric acid, methyl sulfate and phosphoric acid. The catlayst is used generally in an amount of about 0.001 to about 2.0% by weight, preferably about 0.05 to about 1.0% by weight, based on the total amount of the unsaturated fatty acid and the hydroxyl-containing acrylic-type ester.

The inert solvent optionally used is preferably a water-immiscible organic solvent which can be refluxed at a temperature of 180° C. or below, and includes, for example, aromatic hydrocarbons such as benzene, toluene and xylene, and aliphatic hydrocarbons such as heptane, hexane and octane.

Advantageously, polymerization of the hydroxyl-containing acrylic-type ester and the resulting fatty acid-modified acrylic ester is inhibited by adding a polymerization inhibitor such as hydroquinone, methoxyphenol, tert-butyl catechol or benzoquinone to the reaction system as required.

In the above reaction, esterification takes place between the hydroxyl group of the hydroxyl-containing acrylic-type ester and the carboxyl group of the unsaturated fatty acid.

The fatty acid-modified acrylic monomer (A) can consist substantially of the resulting acrylic-type ester in which the unsaturated fatty acid has been introduced by esterification. It may contain some amount of the unreacted unsaturated fatty acid or hydroxyl-containing acrylic-type ester. The amount of the unreacted unsaturated fatty acid should be restricted to not more than 40% by weight, preferably not more than 10% by weight, based on the total amount of the monomer (A), and the amount of the hydroxyl-containing acrylic-type ester should be restricted to not more than 37% by weight, preferably not more than 15% by weight, based on the total weight of the monomer (A).

The resulting fatty acid-modified acrylic monomer (A) may have an acid value of generally not more than 80, preferably not more than 20.

The α,β-ethylenically unsaturated carboxylic acid (B) is an unsaturated aliphatic mono- or polycarboxylic acid having an addition-polymerizable double bond between the carbon atom to which the carboxyl group is attached and a carbon atom located adjacent thereto.

Suitable α,β-ethylenically unsaturated carboxylic acids are those containing 3 to 8 carbon atoms, particularly 3 to 5 carbon atons, and 1 or 2 carboxyl groups, and include those of the following general formula

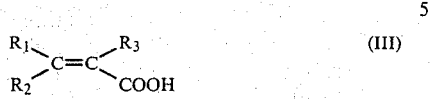

wherein $R_1$ represents a hydrogen atom or a lower alkyl group, $R_2$ represents a hydrogen atom, a lower alkyl group or a carboxyl group, and $R_3$ represents a hydrogen atom, a lower alkyl group or a carboxy-lower alkyl group provided that when $R_2$ represents a carboxyl group, $R_3$ does not represent a carboxy-lower alkyl group.

In formula (III), the term "lower alkyl group" denotes an alkyl group having not more than 4 carbon atoms, preferably a methyl group.

It should be understood that the term "α,β-ethylenically unsaturated carboxylic acid", used in the present specification and claims, also embraces an anhydride of an α,β-ethylenically unsaturated polycarboxylic acid with two or more carboxyl groups.

Specific examples of such an α,β-ethylenically unsaturated carboxylic acid include arcylic acid, methacrylic acid, crotonic acid, itaconic acid, maleic acid, maleic anhydride and fumaric acid. Acrylic acid and methacrylic acid are preferred. These carboxylic acids may be used singly or in combination with each other.

There is no particular restriction on the unsaturated monomer (C) having a Q value, determined by the Q-e theory, of at least 0.1, and it can be selected widely according to the properties required of an aqueous coating composition as a final product. Generally, unsaturated monomers having a Q value of 0.1 to 5 are suitable.

Typical examples of the unsaturated monomer (C) are listed below.

(a) Acrylic or methacrylic esters $C_1$–$C_{18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$–$C_{12}$ alkoxyalkyl esters of acrylic or methacrylic acid, such as methoxybutyl acrylate, methoxybutyl methacrylate, methoxyethyl acrylate, methoxyethyl methacrylate, ethoxybutyl acrylate and ethoxybutyl methacrylate; allyl acrylate and allyl methacrylate; $C_2$–$C_8$ hydroxyalkyl esters of acrylic or methacrylic acid, such as hydroxyethyl acrylate, hydroxyethyl methacrylate, hydroxypropyl acrylate and hydroxypropyl methacrylate; mono- or di-($C_1$–$C_{10}$ alkyl)aminoalkyl esters of acrylic or methacrylic acid, such as diethylaminoethyl acrylate, diethylaminoethyl methacrylate, methylaminoethyl acrylate and methylaminoethyl methacrylate; and $C_5$–$C_{12}$ alkenyloxyalkyl acid of acrylic or methacrylic ester, such as allyloxyethyl acrylate and allyloxyethyl methacrylate.

(b) Vinyl aromatic compounds

Styrene, α-methylstyrene, vinyltoluene, p-chlorostyrene and vinylpyridine.

(c) Diolefin compounds Butadiene, isoprene and chloroprene.

(d) Amides of acrylic or methacrylic acid

Acrylamide, N-methylol acrylamide and N-butoxymethyl acrylamide.

(e) Other unsaturated monomers

Acrylonitrile, methacrylonitrile and methyl isopropenyl ketone.

These unsaturated monomers may be used singly or in combination with each other.

Of these unsaturated monomers, the acrylates and methacrylates (a), and the vinyl aromatic compounds (b) are preferred, and $C_1$–$C_{12}$ alkyl esters of acrylic or methacrylic acid, styrene, α-methylstyrene and vinyltoluene are especially preferred.

According to the present invention, the fatty acid-modified acrylic monomer (A), the α,β-ethylenically unsaturated carboxylic acid (B) and the unsaturated monomer (C) are copolymerized with each other. The copolymerization can be performed by a method known per se for production of acrylic copolymers, for example by a solution polymerization method, an emulsion polymerization method or a suspension polymerization method.

The proportions of the three components to be copolymerized can be varied according to the properties required of the final aqueous coating composition. The suitable proportions based on the total weight of the three components are 7 to 94% by weight, preferably 15 to 80% by weight, for the fatty acid-modified acrylic monomer (A); 5 to 20% by weight, preferably 7 to 15% by weight, for the α,β-ethylenically unsaturated carboxylic acid (B); and 1 to 88% by weight, preferably 13 to 78% by weight, for the unsaturated monomer (C).

Advantageously, the copolymerization is carried out by a solution-polymerization method. The three components are reacted in a suitable inert solvent in the presence of a polymerization catalyst at a reaction temperature of usually about 0° to about 180° C., preferably about 40° to about 170° C., for a period of about 1 to about 20 hours, preferably about 6 to about 10 hours.

The solvent used should desirably be capable of dissolving the resulting copolymer and mixing with water so that gellation does not occur during the copolymerization reaction. Solvents which need not to be removed after copolymerization, but can be used as such in preparing a final aqueous coating composition are especially suitable. Examples of such solvents include Cellosolve-type solvents of the formula HO—$CH_2CH_2$—$OR_4$ (in which $R_4$ represents a hydrogen atom or an alkyl group having 1 to 8 carbon atoms), such as ethylene glycol, butyl Cellosolve and ethyl Cellosolve; carbitol-type solvents of the formula HO—$CH_2CH_2$—$OCH_2CH_2$—$OR_4$ (in which $R_4$ is as defined above), such as diethylene glycol, methyl carbitol and butyl carbitol; glyme-type solvents of the formula $R_5O$—$CH_2CH_2$—$OR_6$ (in which $R_5$ and $R_6$ each represent an alkyl group having 1 to 3 carbon atoms), such as ethylene glycol dimethyl ether; diglyme-type solvents of the formula $R_5O$—$CH_2CH_2OCH_2$—$CH_2OR_6$ (in which $R_5$ and $R_6$ are as defined above), such as diethylene glycol dimethyl ether; Cellosolve acetate-type solvents of the formula $R_7O$—$CH_2CH_2OCO$—$CH_3$ (in which $R_7$ represents a hydrogen atom or a methyl or ethyl group), such as ethylene glycol monoacetate and methyl Cellosolve acetate; alcohol-type solvents of the formula $R_8OH$ (in which $R_8$ represents an alkyl group having 1 to 4 carbon atoms), such as ethanol and propanol; and other solvents such as diacetone alcohol, dioxane, tetrahydrofuran, acetone, dimethylformamide and 3-methoxy-3-methyl-butanol.

Water-immiscible inert solvents may also be used. Preferably, such a water-immiscible solvent has a boiling point of not more than 250° C. so that it can be easily removed by distillation at atmospheric or reduced pressure after the polymerization reaction. Examples of such water-immiscible solvents include aromatic hydrocarbon of the formula

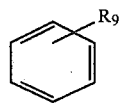

wherein $R_9$ represents a hydrogen atom or an alkyl group having 1 to 4 carbon atoms, or

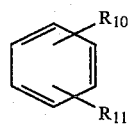

wherein $R_{10}$ and $R_{11}$ each represent an alkyl group having 1 to 4 carbon atoms, such as toluene and xylene; esters of the formula $R_{12}$—COO—$R_{13}$ (in which $R_{12}$ represents an alkyl group having 1 to 6 carbon atoms, and $R_{13}$ represents an alkyl group having 1 to 6 carbon atoms or a cyclohexyl group), such as ethyl formate, butyl acetate and cyclohexyl acetate; ketones of the formula $R_{14}R_{15}C=O$ (in which $R_{14}$ and $R_{15}$ each represent an alkyl group having 1 to 8 carbon atoms, or $R_{14}$ and $R_{15}$, taken together, represent an alkylene group having 4 to 12 carbon atoms), such as methyl ethyl ketone and cyclohexanone; ethers of the formula $R_{14}$—O—$R_{15}$ (in which $R_{14}$ and $R_{15}$ are as defined above), such as ethyl ether and hexyl ether; and alcohols of the formula $R_{16}OH$ (in which $R_{16}$ represents an alkyl group having 5 to 11 carbon atoms), such as hexanol.

The solvent can be used in an amount of 15 to 90% by weight, preferably 20 to 80% by weight, based on the total weight of the three comonomer components.

The polymerization catalyst may be any of radical initiators which can be used in usual radical polymerizations, for example azo compounds, peroxide compounds, sulfides, sulfines, sulfinic acids, diazo compounds, nitroso compounds, redox systems and ionizing radiation.

Advantageously, the copolymerization reaction is carried out such that the final copolymer obtained has a number average molecular weight of about 500 to about 80000, preferably about 1000 to about 50000.

The copolymer desirably has an acid value of generally 5 to 250, preferably 20 to 150.

The resulting copolymer is rendered water-soluble or water-dispersible as such or after removing the solvent. This can be achieved in a customary manner by neutralizing the carboxyl groups present in the copolymer with a known neutralizing agent. Useful neutralizing agents include organic or inorganic bases such as ammonia, amines, alkali metal hydroxides, alkali metal carbonates, and alkali metal bicarbonates. Examples of the amines are primary, secondary or tertiary alkylamines, primary, secondary or tertiary alkanolamines, and cycloalkylamines. Examples of the alkali metal hydroxides are potassium hydroxide and sodium hydroxide. Examples of the alkali metal carbonates or bicarbonates are potassium carbonate, sodium carbonate and sodium bicarbonate. Potassium hydroxide and sodium hydroxide are especially preferred.

The neutralization treatment can be easily performed in a customary manner by adding the neutralizing agent or its aqueous solution to the resulting copolymer or its solution. The amount of the neutralizing agent used is generally 0.1 to 2.0 equivalents, preferably 0.3 to 1.0 equivalent, based on the carboxyl groups in the copolymer.

The copolymer which has thus been rendered water-soluble or water-dispersible is formed into an aqueous solution or dispersion having a resin content of generally 5 to 90% by weight, preferably 10 to 60% by weight, which can then be used as a film-forming component in the aqueous coating composition of this invention.

If required, the aqueous coating composition of this invention may further contain at least one type of additive selected from, for example, extender pigments, coloring pigments, dryers (e.g., cobalt naphthenate or lead naphthenate), rustproofing agents, ultraviolet absorbers, surface-active agents, antiseptics, etc. Addition of dryers can greatly improve the drying property of a coated film prepared from the aqueous coating composition.

The aqueous coating composition of this invention described hereinabove has superior storage stability over a long period of time, and coated films prepared from it are fast-drying and have superior water resistance, weatherability, alkali resistance solvent resistance, chemical resistance, and other properties. By properly selecting the polymerizable unsaturated monomer (C) in preparing the copolymer in accordance with this invention, coating compositions having various characteristics can be obtained.

The copolymer rendered water-soluble or water-dispersible as described hereinabove has an excellent surface-activating property. An oxidation-curable resin emulsion having good stability and superior film properties can be prepared by using such a water-soluble or water-dispersible copolymer in accordance with this invention as an emulsifier in the emulsion polymerization of vinyl monomers such as vinyl aromatic compounds (e.g., styrene), and acrylates or methacrylates (e.g., ethyl acrylate, propyl acrylate, butyl acrylate, ethyl methacrylate, propyl methacrylate or butyl methacrylate). The aqueous coating composition of this invention, therefore, includes resin emulsions formed by such emulsion polymerization.

As required, the aqueous coating composition of this invention can be diluted with water. Coated films prepared from the aqueous coating composition cure sufficiently at room temperature. If desired, the curing may be performed under heat.

Since the aqueous coating composition of this invention cures sufficient at ordinary temperature, it can be used as a versatile paint in coating furniture, buildings, etc. Furthermore, because it can also be cured under heat, it is useful as an industrial paint in coating machines, vehicles, etc.

The following Examples further illustrate the present invention. Unless otherwise specified, all parts and percentages in these examples are by weight.

EXAMPLE 1

(A) A reaction vessel was charged with the following ingredients.

| | |
|---|---|
| Safflower oil fatty acid | 2240 parts |
| Hydroquinone | 1.3 parts |
| Methyl sulfate | 2.6 parts |
| Toluene | 144 parts |

With stirring, the mixture was heated to 120° C. Then, a mixture of the following ingredients was added dropwise to the reactor at 120° C. over the course of 2 hours.

| | |
|---|---|
| Hydroxyethyl methacrylate | 1300 parts |
| Hydroquinone | 2.6 parts |
| Methyl sulfate | 5.6 parts |
| Toluene | 234 parts |

After the addition, the entire mixture was heated to 150° C. The condensed water formed was removed from the reaction system, and the mixture was maintained at 150° C. for 5 hours until the resulting product had an acid value of 8.7. When the acid value of the product reached 8.7, the pressure of the inside of the reactor was reduced, and toluene was distilled under reduced pressure until the amount of the residue on heating reached 95%. A fatty acid-modified acrylic monomer having a Gardner viscosity of D+ was obtained.

(B) Four hundred parts of n-butyl Cellosolve was put into a reactor, and heated to 120° C. A mixture of the following ingredients was added dropwise over the course of about 2 hours.

| | |
|---|---|
| Fatty acid-modified acrylic monomer obtained in (A) above | 532 parts |
| Styrene | 146 parts |
| n-Butyl methacrylate | 46 parts |
| Acrylic acid | 103 parts |
| Azobisdimethylvaleronitrile | 32 parts |

While introducing nitrogen into the reactor and maintaining the reaction temperature at 120° C., the above mixture was added dropwise to the stirred reaction solution. One hour after the addition, 6.4 parts of azobisisobutyronitrile was added to the reaction solution, and two hours from then, 6.4 parts of azobisisobutyronitrile was further added to the reaction solution. Then, the mixture was maintained at 120° C. for 2 hours. After the reaction, the unreacted monomers and n-butyl Cellosolve were distilled off under reduced pressure to adjust the amount of the residue on heating to 75%. There was obtained a copolymer having an acid value of 83.0, a Gardner viscosity (60% n-butyl Cellosolve solution) of Y-Z and a peak molecular weight (determined by gel permeation chromatography; all molecular weights given hereinafter are determined by the same method) of 9000.

The resulting copolymer was neutralized with about 0.8 equivalent of triethylamine and about 0.2 equivalent of 28% aqueous ammonia, based on the carboxyl group of the copolymer. The resulting aqueous solution of the copolymer was mixed with the pigment and dryers shown in Table 1 in the proportions indicated, and dispersed by using a paint conditioner to form an aqueous coating composition.

Water was added to the aqueous coating composition to adjust its viscosity to 70 KU (Krebs-Stormer viscometer), and the resulting composition was coated on a mild steel sheet to a film thickness of about 40 microns by a bar coater. The coated film was dried at 100° C. for 30 minutes, and allowed to stand for 2 hours at a temperature of 20° C. and a humidity of 75%.

The properties of the resulting coated film were tested, and the results are summarized in Table 1.

EXAMPLE 2

(A) Safflower oil fatty acid in the mixing recipe in Example 1, (A) was changed to linseed oil fatty acid, and the other ingredients and their proportions were made the same as in Example 1, (A). Under these conditions, esterification reaction was performed at 150° C. for 5 hours. There was obtained a product having an acid value of 5.9. Toluene was distilled off under reduced pressure to adjust the amount of the residue on heating to 95%. Thus, a fatty acid-modified acrylic monomer having a Gardner viscosity of A was obtained.

(B) A reaction vessel was charged with 300 parts of n-butyl Cellosolve, and it was heated to 120° C. A mixture of the following ingredients was added dropwise over the course of about 2 hours.

| | |
|---|---|
| Fatty acid-modified acrylic monomer obtained in (A) above | 399 parts |
| Styrene | 110 parts |
| n-Butyl methacrylate | 35 parts |
| Acrylic acid | 77 parts |
| Azobisdimethylvaleronitrile | 30 parts |

While introducing nitrogen into the reactor and maintaining the reaction temperature at 120° C., the reaction solution was stirred, and the aforesaid mixture was added to it dropwise. One hour after the addition, 4.8 parts of azobisisobutyronitrile was added to the reaction solution. Two hours from then, 4.8 parts of azobisisobutyronitrile was further added to the reaction solution. The mixture was maintained at 120° C. for 2 hours. After the reaction, the unreacted monomers and n-butyl Cellosolve were distilled under reduced pressure to adjust the amount of the residue on heating to 75%. There was obtained a copolymer having an acid value of 8.17, a Gardner viscosity (60% n-butyl Cellosolve solution) of Y-Z and a molecular weight of 8800.

The resulting copolymer was treated in the same way as in Example 1 to prepare an aqueous coating composition.

The coating composition was coated and dried in the same way as in Example 1, and the coated film was tested. The results are shown in Table 1.

EXAMPLE 3

(A) Esterification reaction was carried out in the same way as in Example 1 except that the methyl sulfate used in Example 1, (A) was changed to p-toluenesulfonic acid. The reaction was performed at 150° C. for 8 hours to form a product having an acid value of 6.0. Toluene was distilled off under reduced pressure to adjust the amount of the residue on heating to 95%. Thus, a fatty acid-modified acrylic monomer having a Gardner viscosity of D.

(B) Six hundred parts of n-butyl Cellosolve was put into a reactor, and heated to 120° C. A mixture of the following ingredients was added dropwise to it over the course of 2 hours.

Fatty acid-modified acrylic monomer

-continued

| | |
|---|---|
| obtained in (A) above | 399 parts |
| Styrene | 110 parts |
| n-Butyl methacrylate | 35 parts |
| Acrylic acid | 77 parts |
| Azobisdimethylvaleronitrile | 24 parts |

While introducing nitrogen into the reactor and maintaining the reaction temperature at 120° C., the reaction solution was stirred and the aforesaid mixture was added dropwise. One hour after the addition, 4.8 parts of azobisisobutyronitrile was added to the reaction solution. Two hours from then, 4.8 parts of azobisisobutyronitrile was further added to the reaction solution. The mixture was maintained at 120° C. for 2 hours. After the reaction, the unreacted monomers and n-butyl Cellosolve were distilled off under reduced pressure to adjust the amount of the residue on heating to 75%. There was obtained a copolymer having an acid value of 81.7, a Gardner viscosity (60% n-butyl Cellosolve solution) of X and a molecular weight of 8500.

The resulting copolymer was treated in the same way as in Example 1 to afford an aqueous coating composition. The coating composition was coated and dried in the same way as in Example 1, and tested. The results are shown in Table 1.

EXAMPLE 4

(A) A mixture of the following ingredients was put into a reactor and heated to 120° C. with stirring.

| | |
|---|---|
| Linseed oil fatty acid | 2240 parts |
| Hydroquinone | 1.2 parts |
| Methyl sulfate | 2.5 parts |
| Heptane | 138 parts |

A mixture of the following ingredients was added dropwise to the reactor at 120° C.

| | |
|---|---|
| Hydroxyethyl acrylate | 1160 parts |
| Hydroquinone | 2.5 parts |
| Methyl sulfate | 7.3 parts |
| Toluene | 225 parts |

After the addition, the mixture was heated to 150° C. The condensed water generated was removed from the reaction system, and the reaction was performed at 150° C. for 7 hours until the acid value of the reaction product reached 8.7. When the acid value of the product reached 8.7, the pressure of the inside of the reactor was reduced, and the solvent was distilled off under reduced pressure until the amount of the residue on heating became 95%. There was obtained a fatty acid-modified acrylic monomer having a Gardner viscosity of $A_2$.

(B) One thousand parts of n-butyl Cellosolve was put into a reactor, and heated to 105° C. A mixture of the following ingredients was added dropwise to it over the course of about 2 hours.

| | |
|---|---|
| Fatty acid-modified monomer obtained in (A) above | 1278 parts |
| Styrene | 402 parts |
| n-Butyl methacrylate | 128 parts |
| Acrylic acid | 258 parts |
| Azobisdimethylvaleronitrile | 80 parts |

While introducing nitrogen into the reactor and maintaining the reaction temperature at 105° C., the reaction solution was stirred, and the aforesaid mixture was added dropwise. One hour after the addition, 16 parts of azobisisobutyronitrile was added. Two hours from then, 16 parts of azobisisobutyronitrile was further added. The mixture was maintained at 105° C. for 2 hours. After the reaction, the unreacted monomers and n-butyl Cellosolve were distilled under reduced pressure to adjust the amount of the residue on heating to 75%. There was obtained a copolymer having an acid value of 84.2, a Gardner viscosity (60% n-butyl Cellosolve solution) of X-Y, and a molecular weight of 8000.

The resulting copolymer was treated in the same way as in Example 1 to form an aqueous coating composition. The coating composition was coated and dried in the same way as in Example 1, and tested. The results are shown in Table 1.

EXAMPLE 5

(A) A mixture of the following ingredients was put into a reactor, and with stirring, heated to 120° C.

| | |
|---|---|
| Tall oil fatty acid | 2240 parts |
| Hydroquinone | 1.3 parts |
| Methyl sulfate | 2.6 parts |
| Toluene | 144 parts |

Then, a mixture of the following ingredients was added dropwise over the course of 2 hours to the reactor at 120° C.

| | |
|---|---|
| Hydroxyethyl methacrylate | 1300 parts |
| Hydroquinone | 2.6 parts |
| Methyl sulfate | 5.6 parts |
| Toluene | 234 parts |

After the addition, the mixture was heated to 150° C. The condensed water generated was removed from the reaction system, and the mixture was reacted at 150° C. for 5.5 hours to afford a product having an acid value of 5.6. The pressure of the inside of the reactor was reduced, and toluene was distilled off under reduced pressure until the amount of the residue on heating became 95%. There was obtained a fatty acid-modified acrylic monomer having a Gardner viscosity of A-B.

(B) Three hundred parts of n-butyl Cellosolve was put into a reactor, and heated to 120° C. A mixture of the following ingredients was added dropwise to it over the course of about 2 hours.

| | |
|---|---|
| Fatty acid-modified acrylic monomer obtained in (A) above | 399 parts |
| Ethyl methacrylate | 130 parts |
| Methacrylic acid | 92 parts |
| Azobisdimethylvaleronitrile | 30 parts |

While introducing nitrogen into the reactor and maintaining the reaction temperature at 120° C., the reaction solution was stirred, and the aforesaid mixture was added dropwise. one hour after the addition, 4.8 parts of azobisisobutyronitrile was added to the reaction solution. Two hours from then, 4.8 parts of azobisisobutyronitrile was further added to the reaction solution. The mixture was maintained at 120° C. for 2 hours. After the reaction, the unreacted monomers and n-butyl Cellosolve were distilled off under reduced pressure to adjust the amount of the residue on heating to 75%. Thus, there was obtained a copolymer having an acid value of 81.7, a Gardner viscosity (60% n-butyl Cellosolve solution) of Y-Z, and a molecular weight of 8300.

The resulting copolymer was treated in the same way as in Example 1 to form an aqueous coating composition. The coating composition was coated and dried in the same way as in Example 1, and tested. The results are shown in Table 1.

EXAMPLE 6

(A) A mixture of the following ingredients was put into a reactor, and with stirring heated to 120° C.

| Soybean oil fatty acid | 2240 parts |
| Hydroquinone | 1.3 parts |
| Methyl sulfate | 2.6 parts |
| Toluene | 144 parts |

Then, a mixture of the following ingredients was added dropwise to the reactor at 120° C. over the course of 2 hours.

| Hydroxyethyl methacrylate | 1300 parts |
| Hydroquinone | 2.6 parts |
| Methyl sulfate | 5.6 parts |
| Toluene | 234 parts |

After the addition, the mixture was heated to 150° C., and the condensed water generated was removed from the reaction system. The reaction was performed at 150° C. for 6 hours to form a product having an acid value of 5.4. The pressure of the inside of the reactor was reduced, and toluene was distilled off under reduced pressure until the amount of the residue on heating became 95%. There was obtained a fatty acid-modified acrylic monomer having a Gardner viscosity of A.

(B) Three hundred parts of n-butyl Cellosolve was put into a reactor, and heated to 120° C. A mixture of the following ingredients was added dropwise to it over the course of about 2 hours.

| Fatty acid-modified acrylic monomer obtained in (A) above | 399 parts |
| Methyl methacrylate | 100 parts |
| 2-Ethylhexyl methacrylate | 30 parts |
| Methacrylic acid | 92 parts |
| Azobisdimethylvaleronitrile | 30 parts |

While introducing nitrogen into the reactor and maintaining the reaction temperature at 120° C., the reaction solution was stirred, and the aforesaid mixture was added dropwise. One hour after the addition, 4.8 parts of azobisisobutyronitrile was added to the reaction solution. Two hours from then, 4.8 parts of azobisisobutyronitrile was further added to the reaction solution. The mixture was maintained at 120° C. for 2 hours. After the reaction, the unreacted monomers and n-butyl Cellosolve were distilled off under reduced pressure to adjust the amount of the residue on heating to 75%. There was obtained a copolymer having an acid value of 82.5, a Gardner viscosity (60% n-butyl Cellosolve solution) of Y and a molecular weight of 9000.

The resulting copolymer was treated in the same way as in Example 1 to form an aqueous coating composition. The coating composition was coated and dried in the same way as in Example 1, and tested. The results are shown in Table 1.

EXAMPLE 7

A reactor was charged with 213 parts of the copolymer solution obtained in Example 1, (B), 3 parts of n-butyl Cellosolve, 763 parts of water and 22.7 parts of triethylamine. The mixture was stirred for about 30 minutes to afford an aqueous solution of the copolymer. A solution of 1 part of ammonium persulfate in 20 parts of water was added to the resulting solution, and then a mixture of 406 parts of n-butyl methacrylate and 8 parts of 1,6-hexanediol diacrylate was added. The mixture was stirred at room temperature for about 40 minutes. When the temperature of the mixture was gradually raised, heat generation began at about 65° C. After the heat generation was over, the reaction was further carried out for 2 hours. Thus, an emulsion composition having a solids content of 40% was obtained.

Seven parts of the resulting emulsion composition was mixed with 3 parts of the aqueous coating composition obtained in Example 1. The mixture was treated in the same way as in Example 1 to form an aqueous coating composition. The coating composition was coated and dried in the same way as in Example 1 and tested. The results are shown in Table 1.

COMPARATIVE EXAMPLE 1

(A) A mixture of the following ingredients was put into a reactor, and with stirring, maintained at 140° to 150° C. to form an addition-reaction product.

| Safflower oil fatty acid | 236 parts |
| Glycidyl methacrylate | 119 parts |
| Hydroquinone | 0.4 part |
| Tetraethyl ammonium bromide | 0.2 part |

The addition reaction between the epoxy group and the carboxyl group was traced by measuring the amount of the remaining carboxyl group. About 4 hours was required until the reaction was completed.

(B) One hundred parts of n-butyl Cellosolve was put into a reactor, and heated to 120° C. Then, a mixture of the following ingredients was added to it dropwise over the course of about 2 hours.

| Addition reaction product obtained in (A) above | 40 parts |
| Styrene | 23 parts |
| n-Butyl methacrylate | 24 parts |
| Acrylic acid | 13 parts |
| Azobisdimethylvaleronitrile | 5 parts |

While introducing nitrogen into the reactor and maintaining the reaction temperature at 120° C., the reaction solution was stirred, and the aforesaid mixture was added dropwise. One hour after the addition, 1 part of azobisisobutyronitrile was added to the reaction solution. Two hours from then, 1 part of azobisisobutyronitrile was further added to the reaction solution. The mixture was maintained at 120° C. for 3 hours. After the reaction, the unreacted monomers and n-butyl Cellosolve were distilled under reduced pressure to adjust the amount of the residue on heating to 75%. There was obtained a copolymer having an acid value of 81.3, a Gardner viscosity (60% n-butyl Cellosolve solution) of Y and a molecular weight of 9000.

The resulting copolymer was treated in the same way as in Example 1 to form an aqueous coating composition. The coating composition was coated and dried in the same way as in Example 1, and tested. The results are shown in Table 1.

COMPARATIVE EXAMPLE 2

An aqueous coating composition was prepared in the same way as in Example 7 except that the copolymer solution obtained in Comparative Example 1, (B) was used as an emulsifier instead of the copolymer solution obtained in Example 1, (B). The coating composition was coated and dried in the same way as in Example 1, and tested. The results are shown in Table 1.

TABLE 1

| Example (Ex.) or Comparative Example (CEx.) | Ex. 1 | Ex. 2 | Ex. 3 | Ex. 4 | Ex. 5 | Ex. 6 | Ex. 7 | CEx. 1 | CEx. 2 |
|---|---|---|---|---|---|---|---|---|---|
| Paint additives (*1) | | | | | | | | | |
| Rutile titanium oxide | 80 | 80 | 80 | 80 | 80 | 80 | 80 | 80 | 80 |
| Dryer | | | | | | | | | |
| Lead naphthenate | 0.45 | 0.45 | 0.45 | 0.45 | 0.45 | 0.45 | 0.45 | 0.45 | 0.45 |
| Cobalt naphthenate | 0.05 | 0.05 | 0.05 | 0.05 | 0.05 | 0.05 | 0.05 | 0.05 | 0.05 |
| Properties of a coated film (*2) | | | | | | | | | |
| Pencil hardness | | | | | | | | | |
| 1 day after forced drying | 3B | 3B | 3B | 3B | 3B | 3B | B | 3B | B |
| 4 days after forced drying | B | B | B | B | B | B | HB | B | HB |
| Crosscut adhesion test (20° C.) | Good | Good | Good | Good | Good | Good | Good | Good | Good |
| Water resistance (dipped for one week) | No change | No change | No change | No change | No change | No change | No change | Blister occurred in 2 days | Blister occurred in 4 days |
| Gloss | 91 | 90 | 90 | 89 | 89 | 88 | 88 | 88 | 87 |

(*1): The amounts of the paint additives are parts by weight per 100 parts by weight of the resin solid. The amounts of the dryers are calculated as metal.
(*2): Methods for testing the properties of the coated film were as follows:
Hardness: Pencil hardness
Gloss: 60° mirror surface reflectance
Adhesion test: One hundred squares each having an area of 1 mm² were provided on a test specimen. An adhesive Cellophane tape was attached to the crosscut surface of the specimen, and than peeled off violently.
Water resistance: A test specimen was dipped in tap water, and observed visually.

What we claim is:

1. An aqueous coating composition comprising a resin in a water-soluble or water-dispersible form as a firm-forming component, said resin being a copolymer of
(A) a fatty acid-modified acrylic monomer comprising the reaction product of an unsaturated fatty acid having at least two non-conjugated double bonds with a hydroxy-containing acrylic or methacrylic ester selected from compounds of the following formulae

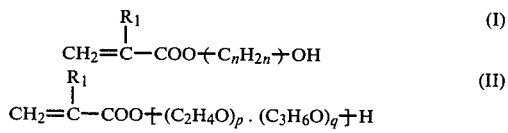

wherein $R_1$ represents a hydrogen atom or a methyl group, n is an integer of 2 to 8, and p and q each represent zero or an integer of 1 to 8 provided that the sum of p and q is 1 to 8,
(B) an α,β-ethylenically unsaturated carboxylic acid, and
(C) an unsaturated monomer having a Q value, determined by the Q-e theory, of at least 0.1 and free from glycidyl group.

2. A composition according to claim 1 wherein said unsaturated fatty acid is a linear or branched unsaturated aliphatic monocarboxylic acid.

3. A composition according to claim 1 wherein said unsaturated fatty acid has 10 to 24 carbon atoms.

4. A composition according to claim 1 wherein said unsaturated fatty acid has an iodine value of at least 80.

5. A composition according to claim 1 wherein said unsaturated fatty acid is a drying oil fatty acid or a semidrying oil fatty acid.

6. A composition according to claim 5 wherein said drying oil fatty acid is selected from the group consisting of safflower oil fatty acid, linseed oil fatty acid, soybean oil fatty acid, sesame oil fatty acid, poppy seed oil fatty acid, perilla oil fatty acid, hemp seed oil fatty acid, grape kernel oil fatty acid, corn oil fatty acid, tall oil fatty acid, sunflower oil fatty acid, cotton seed fatty acid, walnut oil fatty acid and rubber seed oil fatty acid.

7. A composition according to claim 1 wherein the amount of said unsaturated fatty acid is 5 to 65% by weight based on the weight of the copolymer.

8. A composition according to claim 1 wherein said hydroxyl-containing acrylic or methacrylic ester contains 2 to 24 carbon atoms and one hydroxyl group in the ester residue moiety.

9. A composition according to claim 1 wherein said hydroxyl-containing acrylic or methacrylic ester is selected from the group consisting of 2-hydroxyethyl acrylate, 2-hydroxyethyl methacrylate, 2-hydroxypropyl acrylate and 2-hydroxypropyl methacrylate.

10. A composition according to claim 1 wherein said reaction product in (A) is obtained by reacting 1 mole of said unsaturated fatty acid with 0.5 to 1.9 moles of said hydroxyl-containing acrylic or methacrylic ester.

11. A composition according to claim 1 wherein said α,β-ethylenically unsaturated carboxylic acid has 3 to 8 carbon atoms and 1 or 2 carboxyl groups.

12. A composition according to claim 11 wherein said α,β-ethylenically unsaturated carboxylic acid is selected from the group consisting of acrylic acid, methacrylic acid, crotonic acid, itaconic acid, maleic acid, maleic anhydride and fumaric acid.

13. A composition according to claim 1 wherein said unsaturated monomer (C) has a Q value of from 0.1 to 5.

14. A composition according to claim 1 wherein said unsaturated monomer (C) is selected from the group consisting of acrylic esters, methacrylic esters and vinyl aromatic compounds.

15. A composition according to claim 14 wherein said unsaturated monomer (C) is selected from the group consisting of $C_1$-$C_{18}$ alkyl esters of acrylic acid, $C_1$-$C_{18}$ alkyl esters of methacrylic acid, styrene, α-methylstyrene and vinyltoluene.

16. A composition according to claim 1 wherein said copolymer is a copolymer of 7 to 94% by weight of the fatty acid-modified acrylic monomer (A), 5 to 20% by weight of the α,β-ethylenically unsaturated carboxylic acid (B) and 1 to 88% by weight of the unsaturated monomer (C), based on the total weight of said three components.

17. A composition according to claim 16 wherein said copolymer is a copolymer of 15 to 80% by weight of the fatty acid-modified acrylic monomer (A), 7 to 15% by weight of the α,β-ethylenically unsaturated carboxylic acid (B), and 13 to 78% by weight of the unsaturated monomer (C), based on the total weight of said three components.

18. A composition according to claim 1 wherein said copolymer has a number average molecular weight of about 500 to about 80000.

19. A composition according to claim 1 wherein said copolymer has an acid value of from 5 to 200.

20. A composition according to claim 1 wherein said copolymer is rendered water-soluble or water-dispersible by neutralization with an organic or inorganic base.

21. A composition according to claim 1 which is in the form of an aqueous solution or dispersion having a resin content of from 5 to 90% by weight.

22. A composition according to claim 1 which further contains at least one type of additive selected from the group consisting of extender pigments, coloring pigments, dryers, rustproofing agents, ultraviolet absorbers, surface-active agents and antiseptics.

23. An article coated with the aqueous coating composition of claim 1.

24. A process for preparing an aqueous coating composition, which comprises
(1) copolymerizing
(A) a fatty acid-modified acrylic monomer comprising the reaction product of an unsaturated fatty acid having at least two non-conjugated double bonds with a hydroxyl-containing acrylic or methacrylic ester selected from compounds of the following formulae

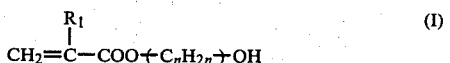
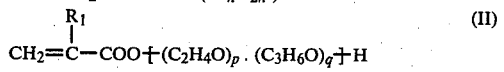

wherein $R_1$ represents a hydrogen atom or a methyl group, n is an integer of 2 to 8, and p and q each represent zero or an integer of 1 to 8 provided that the sum of p and q is 1 to 8,
(B) an α,β-ethylenically unsaturated carboxylic acid, and
(C) an unsaturated monomer having a Q value, determined by the Q-e theory, of at least 0.1 and free from glycidyl group, and
(2) neutralizing the resulting copolymer with an organic or inorganic base to render it water-soluble or water-dispersible.

* * * * *